United States Patent
Ronneberger

(10) Patent No.: US 6,577,917 B1
(45) Date of Patent: Jun. 10, 2003

(54) PROCESS AND APPARATUS FOR THE AUTOMATIC MEASUREMENT OF PROCESSING AND WORKPIECE CHARACTERISTICS WHEN GRINDING GEARS

(75) Inventor: Erich Ronneberger, Waldshut-Tiengen (DE)

(73) Assignee: Reishauer AG, Wallisellen (CH)

( * ) Notice: Subject to any disclaimer, the term of this patent is extended or adjusted under 35 U.S.C. 154(b) by 428 days.

(21) Appl. No.: 09/598,258

(22) Filed: Jun. 21, 2000

(30) Foreign Application Priority Data

Jun. 22, 1999 (DE) .......................... 199 28 500

(51) Int. Cl.⁷ .............................................. G06F 19/00
(52) U.S. Cl. ...................................... 700/164; 700/195
(58) Field of Search ........................ 451/8, 28; 700/164, 700/195

(56) References Cited

U.S. PATENT DOCUMENTS

| | | | | |
|---|---|---|---|---|
| 4,195,446 A | * | 4/1980 | Angst | 451/11 |
| 4,631,869 A | * | 12/1986 | Miyatake et al. | 451/11 |
| 4,755,950 A | | 7/1988 | Rao | |
| 5,759,085 A | * | 6/1998 | Gugenheimer et al. | 451/8 |
| 6,205,371 B1 | * | 3/2001 | Wolter-Doll | 700/174 |

FOREIGN PATENT DOCUMENTS

| | | |
|---|---|---|
| CH | 682853 | 11/1993 |
| DE | 4025552 | 6/1991 |
| DE | 4221688 | 1/1993 |
| DE | 4305408 | 8/1994 |
| DE | 19544620 | 8/1997 |
| JP | 07164314 | 6/1995 |

OTHER PUBLICATIONS

Translation of letter from KAPP GMBH WERKZEUGMA-CHINENFABRIK to the German Patent and Trademark Office (DPM) on Jul. 19, 2001, regarding the unexamined German Patent Applicant 199 28 500 A1, which was filed with the DPM on Jun. 22, 1999.

Translation of letter from KAPP GMBH WERKZEUGMA-CHINENFABRIK to Mr. K. Corbach at Reishauer AG on Nov. 27, 2001, regarding documentation on the subject of radar sensor technology.

* cited by examiner

Primary Examiner—Leo Picard
Assistant Examiner—Kidest Bahta
(74) Attorney, Agent, or Firm—Browdy and Neimark, P.L.L.C.

(57) ABSTRACT

Located for rotation in a machine base (1) is a work spindle (4) for the setting up of a workpiece (6). A grinding spindle (10) for setting up a grinding wheel (11) can be radially infed relative to the work spindle (4) and displaced in the plane at right angles to the infeed direction. A pick-up holder (22) with several measuring sensors (23, 24) is displaceable parallel to the axis (7) by means of an NC controlled spindle (16). With the apparatus described the workpiece (6) can be measured for mesh-aligning before grinding, as well as during grinding (e.g. for avoiding grinding burn), and after grinding (for final inspection). The process permits high productivity with short cycle times and few rejects.

16 Claims, 1 Drawing Sheet

PROCESS AND APPARATUS FOR THE AUTOMATIC MEASUREMENT OF PROCESSING AND WORKPIECE CHARACTERISTICS WHEN GRINDING GEARS

FIELD OF THE INVENTION

The invention concerns a measuring process and an appropriate apparatus on a CNC machining center, preferably for the production of gear toothed gearing and/or other profiles amenable to generation, and for tooth finishing and supplementary machining operations.

BACKGROUND OF THE INVENTION

It is well known that with the advent of CNC gear grinding machines and with it in particular of position-regulated axes and modern sensor technology, a substantial productivity increase in gear grinding has been attained, which in turn has triggered a growing demand for short down-times and a divorcement of the operator from the now rapid working cycle of these machines. Parallel to this a trend towards high quality workpieces of ever higher precision and form accuracy is to be observed. Alongside measures reducing cutting time it is therefore predominantly workpiece change and other preparatory operations at the start and finish, and between two consecutive grinding operations that were, and are being, increasingly automated. Along with the divorcement of the operator from the working cycle of the machine, however, the control of the grinding process evolving from experience is lost, and with it the opportunity to make corrections early enough to prevent machining errors. Hence the new technology of automatic high performance grinding harbors a growing risk potential for rejects or workpiece errors that entail high cost subsequent amendment.

Regarding the task of gear grinding, the differing amounts of tooth flank grinding allowance due to hardening distortion must be so removed as to obtain the ultimate flank form of micrometric dimensions. Economic considerations call for material removal in the shortest possible time. This is restricted by thermally induced crystal structure changes in the workpiece edge zone, the so-called grinding burn. The causes of this phenomenon have been largely investigated.

There are tooth flank grinding machines in existence which provide for the automation of process preparatory and/or process monitoring functions as individual operations, such as mesh aligning or centralizing, as the positioning of the tooth space relative to the generating grinding worm prior to the grinding process is termed. A typical design form of this is shown in U.S. Pat. No. 4,755,950. The characteristic of this solution on a gear tooth form grinding machine is a stationary special feeler which sinks into a tooth space and responds to contact with a tooth flank. The workpiece is subsequently rotated until the second flank makes contact. A computer registers the positions of contact and calculates the mid-position to which the workpiece is turned to centralize it.

In CH 682 853 A5 a simplification of the task is proposed by reducing the number of motions to be performed. A preferred design form of the invention makes use of a sensor with a ball gauge, which makes contact with either the tooth crest or the flanks of a tooth space of the workpiece. Thus the ball gauge registers the deviations both in the radial and in the tangential direction. The scanning system is arranged on the tool column.

At the present level of technology, the workpiece with pre-cut teeth continues to be placed on the work fixture and, at operating speed, subjected to a 100% inspection of all the right and left flanks of the gear. This consists in scanning the tooth flanks with a proximity response stationary inductive or capacitive pick-up. The sensor checks whether the correct gear is set up, and whether the tooth thickness and the radial runout are within the pre-set tolerance range. In an appropriate electronic system a pattern or model is compiled corresponding to the gear, and evaluated with respect to tooth thickness, radial runout and number of teeth. If the values are within tolerance, the rotary offset is determined on the basis of which the automatic electronic mesh aligning of workpiece and grinding worm can take place.

A common feature of the examples mentioned is the automation of the mesh aligning, which must be performed prior to grinding. For this a suitable sensor of various type—contacting or non-contacting—is arranged on the gear manufacturing machine according to special rules. These stated solutions still have considerable disadvantages, however. They are only designed for the mesh aligning task or for inspection prior to grinding. Contacting feelers require the stopping of the work spindle in order to allow their insertion in the tooth space, which prolongs the cycle time. Hence these solutions at least are not suitable for high production gear grinding, as the measurement cannot be undertaken at operating speed.

With the known layout principles, devices and processes, only the mesh aligning is realized. The recording of further geometric and technical processing characteristics during and at the end of grinding is not provided for, and therefore requires further complicated devices, which basically restrict the non-collision clearance in the working area.

Another category of devices is proposed for the registering of grinding burn. From DE 195 44 620 A1, a process for index-generating and profile grinding is known which records the change in the dielectric function in the high frequency range via the change in the capacity of an electrical resonant circuit. To this purpose the sensor must be sunk into the tooth space to within millimeter distance of the ground tooth flank. Hence, as with contacting pick-ups, this solution too requires the stoppage of the work spindle.

In DE 40 25 552 C1 it is suggested that change in the distance between the end faces of the workpiece be measured as substitute value for the temperature rise, and hence the occurrence of grinding burn, due to the grinding process. In accordance with the invention, pairs of measuring systems are fitted to grinding arbors, preferably with strain gauges as measuring element. According to the inventor, the temperature rise in grinding causes abt. 10 to 20 microns in face width change. By comparing with a reference workpiece, it is said that on workpieces subsequently ground with the same grinding data grinding burn can be reliably recognized. This method can only be contemplated for small workpieces, however, as with gears of greater mass the workpiece warming due to grinding is too little for such a measurement.

Based on the solutions prevailing, it is generally characteristic for the level of technology that for the measuring and inspection operations described there are certainly solutions available, but their application on a gear flank grinding machine causes a considerable restriction of the working area, and mostly a high expenditure in resources for equipment and measuring media, as well as long setting up and additional down-times.

SUMMARY OF THE INVENTION

The objective of the present invention, therefore, is to introduce a process and an apparatus by which in combining a number of measuring and inspection functions in one automated measuring apparatus, and the multi-use of the apparatus and the measuring instruments, the economic exploitation of the machine is increased, the quality and availability improved, and the setting up procedure simplified.

This objective is achieved by the present invention which, in one aspect, provides a process for the automatic registering and evaluation of processing and workpiece characteristics when grinding gears. Within an automatic grinding cycle with one or more sensors on the same adapter head a number of measurements are performed. The sensors necessary for the measurement are infed to a position close to the gear tip circle and, by displacing a CNC controlled spindle parallel to the workpiece axis, brought into the position required for the measurement, which is programmed in the CNC.

In another aspect the invention concerns a tooth flank grinding machine which comprises a machine base and a work spindle located for rotation in the machine base and conceived as NC axis, with a work arbor for accommodating a workpiece. A rotationally located grinding spindle is conceived as NC axis, for the attachment of a grinding wheel. A first slide is provided for producing an NC controlled relative motion between grinding wheel and workpiece parallel to the grinding spindle axis. A second slide is displaceable at a right angle to the grinding spindle axis for producing an NC controlled relative motion between grinding wheel and workpiece at a right angle to the displacement direction of the first slide. A third slide is provided for producing an NC controlled infeed motion of the grinding wheel relative to the workpiece in radial direction to the work spindle axis. An NC control unit programmably controls all NC axes. A measuring pick-up holder is radially adjustable relative to the work spindle axis and by means of an additional NC axis is displaceable parallel to the work spindle axis. To the pick-up holder at least one sensor is fitted and connected to the NC control unit.

BRIEF DESCRIPTION OF THE DRAWINGS

A preferred embodiment of the invention is hereinafter described with reference to the drawings, in which.

DETAILED DESCRIPTION OF THE PREFERRED EMBODIMENT

Figure 1:
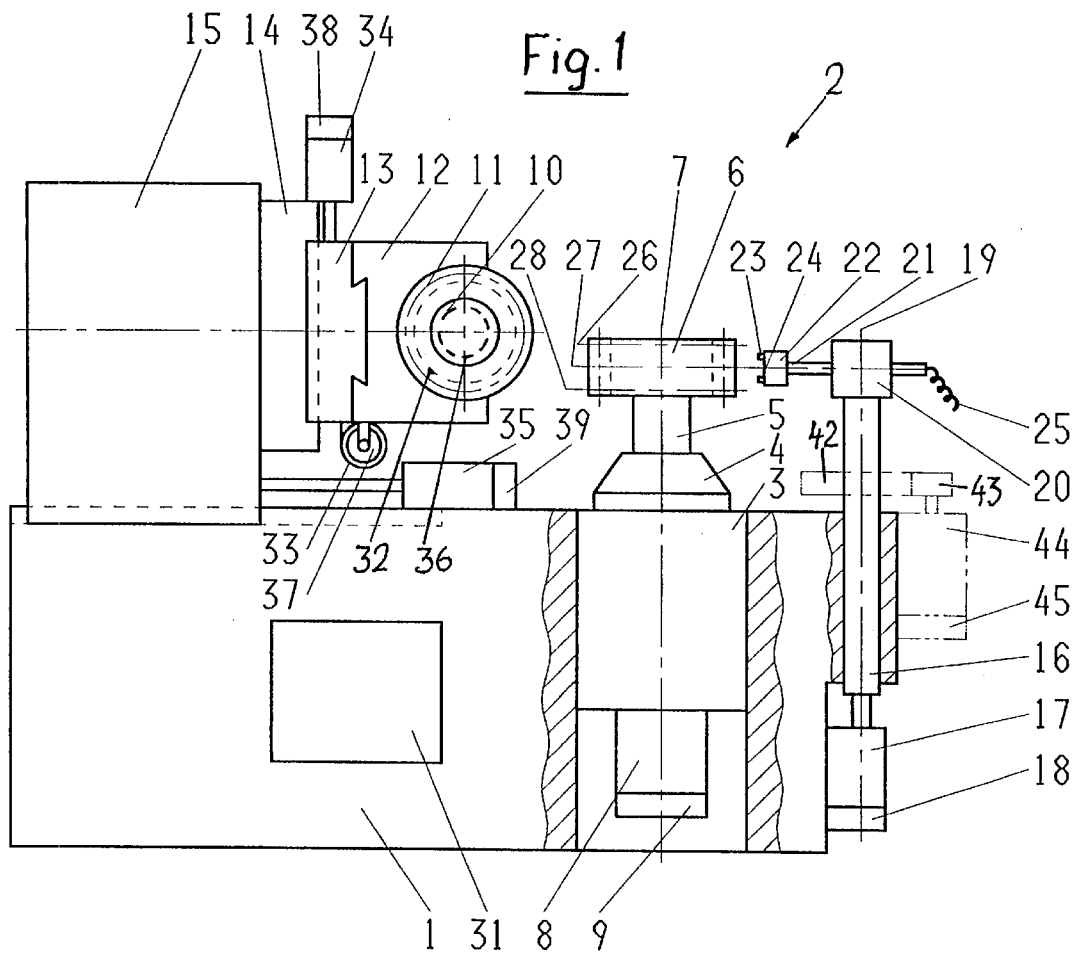
FIG. 1 is a side view of a diagrammatically represented tooth flank grinding machine with the measuring device in accordance with the invention.
Figure 2:
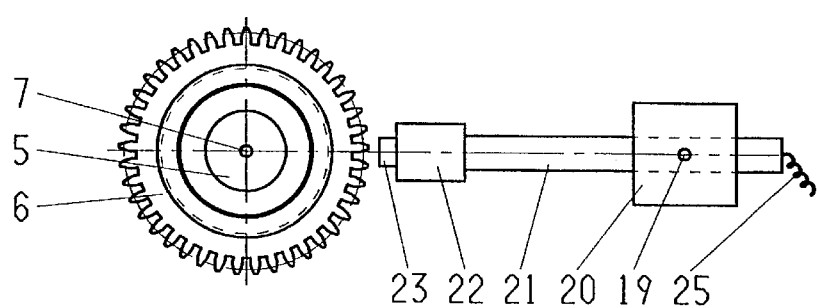
FIG. 2 is the plan view of the workpiece with the measuring pick-up swung into position.

Located in, and firmly attached to, the base 1 of the CNC tooth flank grinding machine 2 shown in FIG. 1 is the work spindle holder 3, in which the work spindle 4 is located for rotation about the axis 7 together with the work arbor 5 and workpiece 6. The work spindle 4 is driven by the motor 8. Its angle of rotation is registered by the rotary encoder 9.

The grinding spindle 10 with the grinding tool 11—a grinding worm or grinding wheel—is likewise connected to the base 1 in familiar manner via the cross-slide 12, the vertical side 13, the swivel head 14 and the infeed slide 15, the grinding spindle 10 and the slides 12, 13 and 15 being driven by motors 32, 33, 34, 35, and constituting together with the allocated rotary and linear encoders 36, 37, 38, 39, the same as the work spindle with motor 8 and rotary encoder 9, the NC axes of the CNC control system 31.

A further NC axis according to the invention is a spindle 16 arranged for displacement parallel to the workpiece axis 7 and for swiveling about the axis 19, carrying at its upper end the measuring pick-up holder 20. The displacement is effected with the motor 17 with the rotary encoder 18. The swivel action is best effected with a pneumatic cylinder (not shown).

Attached to the front end of the axially adjustable pick-up tube 21 is an adapter 22 with one or more pick-up sensors 23, 24 arranged preferably one above the other in the direction of the axis 7, and whose signals are transmitted via signal cables 25 to the CNC control unit 31. In the working position shown here, the sensors 23, 24 are at the distance from the gear tip circle necessary for the measurement. If necessary for space reasons, the measuring pick-up holder 20 is swiveled clear of the working area prior to workpiece change.

In another design version the swivel action of the pick-up holder 20 about the axis 19 can also be realized via an NC axis, which certainly increases costs, but reduces the setting up work, especially if the sensors are mutually offset laterally. This variant is indicated symbolically in FIG. 1 by chain-dotted lines, with gear 42 connected for axial displacement but no rotation to the spindle 16, the pinion 43 engaging with the former and driven by the motor 44, and the rotary encoder 45.

To perform a measuring operation, the spindle 16 is brought to a position pre-selected via the control unit 31, and with the swiveled-in sensor 23 or 24 the workpiece 6—rotating or stationary at a pre-selected angular position—is scanned without contact in planes 26, 27, 28 perpendicular to its axis of rotation. Measuring results that can be determined in this manner before, during, or for inspection purposes after grinding the workpiece include, among others:

the position and position change of the upper and lower end face of the gear, the number of teeth and the variation in tooth pitch around the workpiece circumference, the angular position of the tooth spaces (mesh aligning and re-aligning), the flank machining allowance before grinding (infeed restriction), the helix angle beta (measurement in the planes 26, 28), the temperature at the tooth tip (grinding burn monitoring), vibrations of the workpiece via liquid jet.

The measured values serve on the one hand for setting up a new workpiece, i.e. preparation of the grinding cycle (e.g. determination of the stroke reversal points of the grinding wheel or location of the tooth space angular position relative to the grinding wheel profile), and on the other hand for monitoring characteristic processing data (base tangent length by "span gauging", tooth tip temperature etc.), of which deviation off the set desired value can be used in the automatic machining process for adapting processing parameters or to switch off the machine in order to prevent rejects in production or damage to the machine. The desired values can either be calculated from the specifications of the workpiece and entered manually, or obtained by the automatic measurement of the first workpiece declared as good. Since the machining process and the measuring process are not kinematically inter-coupled, some of these measurements can be carried out simultaneously with operations in the grinding cycle, so that they require no additional cycle time. By the continuous monitoring, any process deviations can be recognized in good time and appropriate adaptations of the processing parameters undertaken. The solution embodied in the invention permits the registering of many relevant measurement values without impairing the scarce space around the workpiece or lengthening the cycle time. The invention can be employed for small, medium and large series manufacture.

Naturally the NC axes for producing the relative linear action and the swivel action between grinding wheel 11 and workpiece 6 can also be solved differently. One or more of these actions can for example be performed by the work spindle holder 3.

What is claimed is:

1. A process for the automatic registering and evaluation of processing and workpiece characteristics when grinding gears, wherein within an automatic grinding cycle with at least one sensor on a single adapter head mounted on a CNC controlled spindle, a number of dissimilar measurements is performed, by which the sensor necessary for the measurement is infed to a position close to a gear tip circle and, by displacing the CNC controlled spindle parallel to the workpiece axis in order to displace the adapter head, is brought into a position required for each of the measurements, which is programmed in the CNC.

2. The process in accordance with claim 1, wherein the registering of the workpiece and processing characteristics takes place before, during and after the grinding of the workpiece.

3. The process in accordance with claim 1, wherein the measurements are performed with a proximity sensor in several planes at a periphery of the workpiece by displacing the CNC controlled spindle.

4. The process in accordance with claim 1, wherein on the adapter head two or more sensors are fitted, which are designed for the measurement of several like or unlike physical characteristics.

5. A process for the automatic registering and evaluation of processing and workpiece characteristics when grinding gears, wherein within an automatic grinding cycle with at least one sensor on an adapter head a number of dissimilar measurements is performed, by which the sensor necessary for the measurement is infed to a position close to a gear:tip circle and, by displacing a CNC controlled spindle parallel to the workpiece axis, brought into a position required for the measurement, which is programmed in the CNC, and further wherein by means of data measured and evaluated in the CNC, a number of the processing and workpiece characteristics stated below are determined:

a position and position change of an upper and lower end face of the workpiece, a number of teeth and a tooth pitch variation round a workpiece circumference, an angular position of tooth spaces, tooth flank material allowance before grinding, a helix angle beta, a temperature at a tooth tip, vibrations of the workpiece via liquid jet.

6. The process in accordance with claim 1, wherein desired values of the registered processing and workpiece characteristics are calculated or acquired by an automatic measurement of a workpiece declared as good.

7. The process in accordance with claim 1, wherein by means of appropriate NC programming of the grinding process, the measurement and evaluation of at least several of the processing and workpiece characteristics take place simultaneously with other processing steps in the grinding process.

8. The process in accordance with claim 1, wherein for the desired/actual deviations in tooth pitch and rough component flank allowance tolerance limits are entered in the CNC, the transgression of which is employed for an appropriate adaptation of the processing parameters by the CNC or for production interruption.

9. The process in accordance with claim 1, wherein particularly the measurements made after completion of the grinding process are employed—in the event of transgression of the programmed desired/actual deviations—to interrupt the automatic production of the machine.

10. A tooth flank grinding machine comprising:

a machine base, a work spindle located for rotation in the machine base and conceived as NC axis, with a work arbor for accommodating a workpiece, a rotationally located grinding spindle, conceived as NC axis, for the attachment of a grinding wheel, a first slide for producing an NC controlled relative motion between grinding wheel and workpiece parallel to a grinding spindle axis, a second slide displaceable at right angles to the grinding spindle axis for producing an NC controlled relative motion between grinding wheel and workpiece at right angles to the displacement direction of the first slide, a third slide for producing an NC controlled infeed motion of the grinding wheel relative to the workpiece in radial direction to a work spindle axis, an NC control unit via which all NC axes are program controlled, wherein a measuring pick-up holder is radically adjustable relative to the work spindle axis and by means of an additional NC axis displaceable parallel to the work spindle axis, to which pick-up holder at least one sensor is fitted and connected to the NC control unit.

11. The machine in accordance with claim 10, in which the measuring pick-up holder is additionally laterally movable.

12. The machine in accordance with claim 11, in which the lateral movement of the pick-up holder is controlled via a further NC axis.

13. The machine in accordance with claim 10, in which the additional NC axis is conceived as a spindle.

14. The machine in accordance with claim 10, in which several sensors are arranged on the measuring pick-up holder.

15. The machine in accordance with claim 14, in which the sensors are offset to one another in a direction of the work spindle axis.

16. The process in accordance with claim 1, wherein a first spindle is used for displacing a grinding tool, a second spindle is used for displacing a gear to be ground, and each of the first and second spindles is different from the CNC controlled spindle.

* * * * *